United States Patent [19]

Suzuki

[11] Patent Number: 4,699,892
[45] Date of Patent: Oct. 13, 1987

[54] COMPOSITE MEMBRANE HAVING A SURFACE LAYER OF AN ULTRATHIN FILM OF CAGE-SHAPED ZEOLITE AND PROCESSES FOR PRODUCTION THEREOF

[76] Inventor: Hiroshi Suzuki, No. 12-11, Nakayama, 3-chome, Ichikawa, Chiba 272, Japan

[21] Appl. No.: 823,105

[22] Filed: Jan. 27, 1986

Related U.S. Application Data

[63] Continuation of Ser. No. 633,979, Jul. 24, 1984, abandoned.

[30] Foreign Application Priority Data

Jul. 26, 1983 [JP] Japan ................................. 58-135155

[51] Int. Cl.$^4$ .......................... B01J 20/18; B01J 29/06
[52] U.S. Cl. ......................................... 502/4; 502/60; 502/61
[58] Field of Search .................. 502/4, 62, 61, 64, 527

[56] References Cited

U.S. PATENT DOCUMENTS

| | | | |
|---|---|---|---|
| 3,244,643 | 4/1966 | Schwartz | 502/64 |
| 3,468,815 | 9/1969 | Cole et al. | 502/64 |
| 3,781,226 | 12/1973 | Schwartz | 502/62 |
| 3,795,631 | 3/1974 | Heinze et al. | 502/64 |
| 4,013,566 | 3/1977 | Taylor | 502/62 |
| 4,288,346 | 9/1981 | Hunter et al. | 502/4 |

OTHER PUBLICATIONS

"Infrared Studies of the Interaction of Acetylene with a Silver A Zeolite", Howard et al., *Zeolites*, vol. 4, (Jan. 1984), 45–50.

"Surface Metal Ion Inhancement of Thermally Treated Zeolites", Willis et al., *American Chemical Society*, vol. 108, (18), (1986), 5657–5659.

S. Loeb and S. Sourirajan: *Advances in Chemistry Series*, 38, 117 (1963).

J. E. Cadotte et al.: "In–Situ Formed Condensation Polymers for Reverse Osmosis Membranes", PB Report, Nov. 1972, 229 337 NTIS, U.S. Dept. of Commerce.

R. M. Barrer: "Molecular Sieves" p. 39, published by Society of the Chemica Industry, London (1968).

*Zeolite Molecular Sieves*, Donald W. Breck, John Wiley & Sons, New York, pp. 249–250 and 375.

*Zeolite and Clay Minerals as Sorbents and Molecular Sieves*, R. M. Barrer, FRS Academic Press, London, pp. 12 and 21 (1968).

"Some Aspects of Molecular Sieve Science Technology", Jubilee Memorial Lecture, *Chemistry and Industry*, pp. 1203–1212 (Sep. 1968).

D. M. Breck and E. M. Flanigan: "Molecular Sieves", p. 47, published by Society of the Chemical Industry (1968).

Primary Examiner—Carl F. Dees
Attorney, Agent, or Firm—Fisher, Christen & Sabol

[57] ABSTRACT

A composite membrane having molecular sieve activity and/or catalytic activity composed of a porous support of a metal, an inorganic material or a polymeric material and combined with its one surface, an ultrathin film of a cage-shaped zeolite composed of a 6-, 8- 10- or 12-membered oxygen ring window having aluminum or gallium atoms, silicon or germanium atoms, and oxygen atoms as constituent members. The composite membrane can be produced, for example, by the various processes described' and claimed herein.

11 Claims, No Drawings

COMPOSITE MEMBRANE HAVING A SURFACE LAYER OF AN ULTRATHIN FILM OF CAGE-SHAPED ZEOLITE AND PROCESSES FOR PRODUCTION THEREOF

This is a continuation of application Ser. No. 633,979, filed July 24, 1984 and now abandoned.

BACKGOUND OF THE INVENTION

1. Field of the Invention

This invention relates to a novel composite membrane of the so-called functional membrane which is very stable to heat and chemicals and has high and selective molecular sieve activity and/or catalytic activity, and to processes for the production of the composite membrane.

2. Description of the Prior Art

Naturally occurring zeolites were already known before 1930. Synthetic zeolites having molecular sieve activity were later studied, notably by a systematic and comprehensive work of R. M. Barrer and his coworkers which began in the middle of 1940s. The outcome of this work is seen, for example, in R. M. Barrer: "Molecular Sieves", page 39, published by Society of the Chemical Industry (1968). The research workers of the Linde Division of Union Carbide Corporation who were motivated by the research results of Barrer et al. succeeded in the commercial production of a molecular sieve zeolite in a single crystal phase by crystallizing a homogeneous or heterogeneous aluminosilicate gel under hydrothermal conditions at a temperature of about 100° C. (see, or example, D. M. Breck and E. M. Flanigan: "Molecular Sieves", page 47, published by Society of the Chemical Industry in 1968).

Zeolites which have previously been used commercially are in the form of granules, and their function is either an adsorptive separating action or a catalytic action. The adsorptive separation process on granular molecular sieves is a non-continuous batch process involving alternate adsorption and desorption and has low economic feasibility. If there were a membranous article having a zeolite surface, it would be possible to carry out this process continuously on it without attendant changes in phase, and its economic advantage would be greatly increased. So far, however, no such membranous article has been proposed.

On the other hand, if catalysis is effected on the surface of granular zeolite, the reaction product cannot be separated in situ from the reactants, and another separation step is required. In some cases, the reaction product stays on the granular zeolite for a long time, and this causes the defect that the reaction further proceeds to form by-products in addition to the desired main product.

If there were a membranous article having a zeolite surface layer, it would have both a molecular sieve separating action and a catalytic action and would be able to achieve a continuous process without changes in phase. Such a membranous article has not yet been known. Clearly, with granular zeolites, it is virtually impossible to perform adsorptive separation and catalysis at the same time.

Reverse osmosis membranes or ultrafiltration membranes have widely been known as functional membranes. These functional membranes are known as the Loeb-Sourirajan membranes [see, for example, S. Loeb and S. Sourirajan: Advan. Chem Ser., 38, 117 (1963)]. Such anisotropic organic polymeric membranes have come into widespread acceptance, and in recent years, compostie membrance have been known which are obtained by bonding a polymeric material on a previously prepared porous support by such a method as coating or plasma polymerization (see, for example, J. E. Cadotte, et al. "In-situ Formed Condensation Polymers for Reverse Osmosis Membranes", P B Report, November 1972, 229 to 337, NTIS, U. S. Dept. of Commerce). However, the active surface layers of the functional membranes now in use do nqt have a sufficient separating action on a molecular level, and none of them simultaneously have a catalytic action.

The formation of the active surface layer of the Leob-Sourirajan membranes is based on the theory of coacervation of a solution. Commercially available composite membranes are obtained by forming on a porous support a thin film of a polymeric material having the ability to dissolve selectively a specified component of a feed material.

SUMMARY OF THE INVENTION

The present invention quite differs from the prior art in which membrane separation is carried out by "dissolution—diffusion" as stated hereinabove. Its primary object is to achieve the purposes and effects contemplated herein by providing a composite membrane composed of a porous support and an ultrathin film of a cage-shaped zeolite having a three-dimensional network sstructure formed as a surface layer on the porous support.

According to this invention, there is provided a composite membrane having molecular sieve activity and/or catalytic activity composed of a porous support of a metal, an inorganic material or a polymeric material and combined with its one surface, an ultrathin film of a cage-shaped zeolite composed of a 6-, 8-, 10- or 12-membered oxygen ring window having aluminum or gallium atoms, silicon or germanium atoms, and oxygen atoms as constituent members.

This invention also provides processes for producing the aforesaid composite membrane.

The term "ultrathin film", as used herein, denotes a film having a thickness in the range of about several hundred Å (angstrom) to 10 Å.

DETAILED DESCRIPTION OF PREFERRED EMBODIMENTS

The ultrathin zeolite film surface layer is composed of a cage-shaped zeolite having a three-dimensional network structure. The network constituting its crystal lattice has a oxygen ring window formed of a cyclic oxygen linkage of an Al or Ga atom and an Si or Ge atom (Si—O—Si, Si—O—Al, Si—O—Ga, Ge—O—Ge, Ge—O—Al—, Ge—O—Ga or Ga—O—Ga). This oxygen ring window is 6-, 8-, 10- or 12-membered. The 6-membered oxygen ring window has a pore size of about 2.2 Å on an average. Since hydrogen has a molecular size of 2.4 Å, there are very few molecules which can pass through the 6-membered oxygen ring window, and its utility is limited. On the other hand, the 8- to 12-membered oxygen ring windows have a pore size in the range of about 3 to about 12 Å, and oxygen ring windows of the same number of members may slightly differ in pore size depending upon the type of the zeolite. This is because oxygen atoms constituting the oxygen ring windows are not necessarily aligned in a plane. The pore size of the zeolite also differs depending upon the difference in the metal ion, and the pore size of the zeolite can be changed to some extent by ion exchange. It is generally believed that such a change in pore size is due to changes in the types, number and positions of metal ions existing near the window of the zeolite or metal ions introduced into such a site by ion-exchange, thus, with ultrathin films of the cage-shaped zeolite having a mainly 8- to 12-membered oxygen ring structure, a very broad range of conditions can be uniformly set up over the entire membrane by selecting the composition of the raw material, the gellation conditions and hydrothermal treatment (crystallization) conditions. Hence, these ultrathin zeolite films are particularly preferred for achieving the object of this invention. The composite membrane of this invention having an ultrathin film surface layer of the cage-shaped zeolite having a constant pore size on a milecular level is basically different from membranes which are composed of organic polymeric materials formed by coacervation, coating, etc. and adapted for separation by the differences in dissolution and diffusion.

The advent of the composite membrane of this invention having a surface layer of an ultrathin film of a cage-shaped zeolite makes it easy to commercialize the molecular sieve effect of zeolite. Unlike the conventional process involving alternate adsorption and desorption, the use of the composite membrane of this invention makes it possible to practice commercially easily and economically a so-called molecular sieve reverse osmosis method by which separation can be achieved in situ continuously without changes in phase.

Below are described some typical specific examples of using the composite membrane of the invention for the purpose of achieving a molecular sieve effect. Such cannot be achieved by the use of known granular zeolites.

(1) The composite membrane having a surface layer of an ultrathin film of a CaA-type cage-shaped zeolite can easily remove n-paraffins and n-olefins for increasing the octane number of gasoline. The n-paraffins and n-olefins so separated are important raw materials in the chemical industry. Accordingly, this method serves a double purpose. Likewise, this composite membrane easily removes n-paraffins from light kerosene fractions. Since light oil from which the n-paraffins have been removed has a reduced pour point, it can give a solution to the problem of the operating failure of diesel cars in the wintertime and in cold climate. Furthermore, this obviates the need for using pour point depressants which are composed of expensive polymeric substances. The composite membrane can also easily remove n-paraffins from lubricant oil fractions. Hence, this can obviates the need for low-temperature treatment or solvent extraction which is complex and costly.

(2) The composite membrane having a surface layer of an ultrathin film of CaA-type cage-shaped zeolite obtained by converting a surface layer of an ultrathin film of an NaA-type cage-shaped zeolite by ion exchange has a very useful molecular sieve action, and can achieve selective separation of butene-1 alone from $C_4$ hydrocarbon fractions, and selective separation of aliphatic hydrocarbons from aromatic hydrocarbons.

(3) The composite membrane having a surface layer of an ultrathin film of a CsA-type cage-shaped zeolite converted from a CaA-type cage-shaped zeolite is useful for the selective separation of radioisotopes, sulfur compounds, etc.

(4) The composite membrane having a surface layer of an ultrathin film of 13X-type zeolite makes possible the continuous separation of hydrogen sulfide, mercaptan and carbond dioxide gas which are impurities of LNG and LPG. Furthermore, this composite membrane makes it possible to separate moisture, carbon dioxide gas, hydrocarbons and nitrogen from air selectively and continuously while leaving oxygen and argon on the high-pressure feed side. Application of this method makes it possible to compress air by the exhaust turbine of an internal combustion engine and to supply oxygen-enriched air or a gaseous mixture of 95% oxygen and 5% argon to the engine. This composite membrane can also be used in an oxygen supplying device for oxidation reaction or a simple oxygen generating device for medical therapy. Pure oxygen and/or pure argon can be obtained by additionally using a separating device in which the composite membrane of the invention is used at low temperatures.

(5) The composite membrane having a surface layer of an ultrathin film of a ZSM-5-type zeolite exhibits unique characteristics in the molecular sieving of xylene isomers. Namely, it has marked selectively whereby m-xylene is removed by the molecular sieve but p-xylene passes through it. The ultrathin film of ZSM-5-type zeolite can be produced, for example, by forming a thin gel film by gentle sedimentation from a mixture of tetra-n-propyl ammonium hydroxide, sodium hydroxide, aluminum hydroxide and silica sol through a microfilter, and hydrothermally treating it at a temperature of, for example, 100° C., for a period of, for example, 2 days. In this case, tetra-n-propyl ammonium ion is an organic base which cannot be exchanged, but the sodium cation of $Na_2O$ is ion-exchangeable. The surface layer of this composite membrane is a stable cage-shaped zeolite layer having a very high $SiO_2/Al_2O_3$ ratio of about 10 to 100. Also, in the case of silicalite, the least of $Al_2O_3$.

For the purpose of achieving the molecular sieve effect alone, the composite membrane of this invention may be used without performing ion exchanging of the crystallized thin gel layer.

When the composite membrane of this invention is to be used for its catalytic effect, it is first necessary to ion-exchange the alkali metal, etc. in the crystallized thin gel layer. For example, in a typical NaX or NaY-type zeolite, an $Na^+$ ion always exists near the $(AlO_4)-$group in the zeolite structure and reduces the catalytic action of the zeolite, It is necessary therefore to impart and increase catalytic activeiy by ion exchange. The method of ion exchange and the properties of specified types of zeolite structures obtained by ion exchange are already known in the art with regard to granular zeolites, and therefore a detailed description of these is omitted in the present application.

Some specific examples of using the composite membrane of this invention for its catalytic effect are described below.

(A) By passing methanol and toluene through the composite membrane having an ultrathin film of a RbY-type zeolite, styrene monomer and ethylbenzene are obtained on the separation side.

(B) By passing formaldehyde and toluene through the composite membrane having an ultrathin film of a CsY-type zeolite, styrene monomer is obtained on the separation side.

(C) When propylene and steam are passed at about 120° C. through the composite membrane having an ultrathin film of a Pd-CuY-type zeolite, acetone is obtained on the separation side by the high selectivity of the zeolite.

(D) When ethylene is passed through the composite membrane having an ultrathin layer of a RhY-type zeolite, n-butene is obtained on the separation side.

(E) When hexene-1 is passed through the composite membrane having an ultrathin film of a HY-type zeolite, benezene is obtained.

The functions of the composite membranes of this invention independently having a molecular sieve effect and a catalytic effect have been specifically described hereinabove. The composite membrane of this invention is further characterized by having both a molecular sieve effect and a catalytic effect simultaneously. This utility is described by the following specific examples.

(i) When a mixture of hydrogen, propylene and isobutylene is passed through the composite membrane having a surface layer of an ulrathin film of a Pt-CaA cage-shaped zeolite, only hydrogen and propane are obtained on the separation side. This means that selective hydrogenation of propylene and molecular sieve separation are achieved. When a mixture of trans-butene-2 and cis-butene-2 is passed through the same mebrane, only transbutene-2 is selectively hydrogenated, and separated by the molecular sieve effect.

(ii) WHen cyclohexane is passed through the membrane having a surface layer of an ultrathin film of a Pt-Y-type or Pd-Y-type cage-shaped zeolite, benzene formed by catalytic dehydrogenetion is selectively separated by molecular sieves.

(iii) When a heavy oil and hydrogen are passed through the composite membrane having a surface layer of an ultrathin film of a Y-type cage-shaped zeolite having a rare earth or transition metal deposited thereon by ion exchange, light hydrocarbons alone obtained by hydrogenolysis are separated by molecular sieves. This composite membrane is characterized by being stable to nitrogen, sulfur and compounds of these in the starting heavy oil and having strong resistance to poisoning.

(iv) When an industrial kerosene of the Minas origin is passed through the composite membrane having a surface layer of an ultrathin film of zeolite obtained by ion-exchanging of a NaA-type zeolite with $Ca^{2+}$ and Pt or Pd, hydrogeneolysis takes place to form low-molecular-weight n-paraffins, which are separated by molecular sieves.

(v) When cyclohexanone oxime and hydrogen are passed through the composite membrane having a HY-type cage-shaped zeolite ion-exchanged with a rare earth or transition metal, Beckmann rearrangement and hydrogenolysis take place by its catalytic action, and by its molecular sieve effect, omega-aminocarboxylic acid is obtained on the separation side. When phenol and an aldehyde or a ketone (for example, acetone) are passed through the same composite membrane, p,p'-bisphenol is synthesized and separated by molecular sieves.

(vi) The composite membrane having a surface layer of an ultrathin film of a HZSM-5-type zeolite has both a selective molecular sieve effect and a catalytic effect on aromatic hydrocarbons. For example, when a xylene isomeric mixture is passed through this composite membrane, the membrane permits selective permeation of p-xylene, ethylbenzene, o-xylene and m-xylene in this order to the separation side, and catalyzes the isomerization of ethylbenzene, o-xylene and m-xylene to p-xylene.

(vii) When toluene and methanol are passed at 400° C. through the composite membrane having a surface layer of an ultrathin film of a Co-P-ZSM-5 type zeolite converted from an ultrathin film of HZSM-5-type zeolite by ion exchange, catalytic methylation takes place and by its molecular sieve effect, p-xylene is separated selectively.

The foregoing examples only illustrate typical examples of the composite membrane of this invention and its application, and do not in any way limit the present invention.

The composite membrane of this invention can be produced by various processes. As preferred embodiments, the following processes A to E can be cited.

PROCESS A

A process which comprises (a) mixing an aluminate or gallate and a silicate or germanate in the form of an alkali metal salt, an alkaline earth salt, an ammonium salt or alower alkyl-substituted ammonium salt with an aqueous solution of a hydroxide of an alkaki metal, an alkaline earth metal, ammonium or an alkyl-substituted ammonium to form a gel, (b) depositing the formed gel on one surface of a porous support of a metal, an inorganic material or a polymeric material or a sense support of the same material capable of being rendered porous by a chemical aftertreatment to form a surface gel layer, (c) hydrothermally treating the surface gel layer at a temperature of at least 30° C. to crystallize the gel, (d) if required, reducing the content of the alkali metal, alkaline earth metal, ammonium or alkyl-substituted ammonium in the crystallized get to not more than 1% by an ion- exchange treatment, (e) when the support is dense, chemically treating it to render it porous, and (f) washing and drying the resulting composite.

Process A will be more specifically described. As a first step, preferably sodium aluminate or sodium gallate and sodium silicate or sodium germanium are mixed with an aqueous solution of preferably sodium hydroxide or potassium hydroixde to form a unifrom gel which is deposited on a support to form an ultrathin film surface layer. Good results are obtained when the support has a high affinity for gelled substances. For example, No. 7930 glass made by Corning Glass Works Company or glass generally called VYCOR glass is especially preferred as the support. This glass is porous quartz glass obtained by leaching a material having silicon and boron highly dispersed therein, and removing boron oxide by using hydrochloric acid, and its average pore size is said to be about 40 Å.

In order to deposit the gel uniformly on the support without formation of pinholes, it is necessary to pass the gel through a microfilter having a size of about 0.2 micron or below and gently deposit it uniformly on the support. Fairly good results are obtained by using a porous metallic support or a dense metallic support capable of being rendered porous by a chemical aftertreatment. Other various gels and commercially useful A, X, Y, L, FU-1, ZSM-5 and silicalite type cage-shaped zeolites can be produced by methods known per se.

The gel deposited on the support can be hydrothermally treated by the same method as in the hydrothermal treatment carried out in the production of granular zeolites. The especially preferred treating tempreture is about 100° C. Generally, at lower treating temperatures, a longer period of time is required for crystallization. If the treating temperature is higher, the rate of crystallization becomes faster. These treating temperature and time can be prescribed substantially in accordance with the know-how of the production of granular zeolites. A surface layer of an ultrathin film of a cage-shaped zeolite generally formed in a Na-type and/or K-type can be ion-exchanged by conventional methods. Complete ion-exchange to H-type can be achieved in accordance with the method of producing "superstabilized zeolites".

To deposit the gel uniformly in a very thin film, it is desirable to use a smooth surface of a porous support. The smooth surface, as referred to herein, means a smooth surface having a poor size of about 100 Å. When it is difficult to obtain a suitable support for this purpose, it is possible to form the surface layer of an ultrathin film of a cage-shaped zeolite on one surface of a dense support and thereafter chemically treating the support to render it porous. Examples of the porous support obtained by this method include such metal supports as Raney nickel from which a part of the metal has been removed by etching, such inorganic supports as VYCOR 7930 glass obtained by removing a borax glass phase from a quartz glass phase, and an organic polymeric porous support obtained by blending a polymer with a polymer having low chemical resistance and treating the blend with a chemical to render it porous.

Washing and drying of the resulting composite can be carried out in quite the same way as in the case of granular zeolites.

PROCESS B

A process which comprises (a) forming an ultrathin film of an alloy composed of aluminum or gallium and silicon or germanium on one surface of a porous support of a metal, an inorganic material or a polymeric material or a dense support of the same material capable of being rendered porous by a chemical after-treatment, (b) subjecting the ultrathin alloy film to an oxidation treatment, (c) dipping the oxidized ultrathin film in an aqueous solution of a hydroxide of an alkali metal, an alkaline earth metal, ammonium or an alkyl-substituted ammonium to form a surface gel layer, (d) hydrothermally treating the formed surface gel layer at a temperature of at least 30° C. to crystallize it, (e) if required, reducing the content of the alkali metal, alkaline earth metal, ammonium or alkyl-substituted ammonium in the crystallized gel to not more than 1% by an ion-exchange treatment, (f) when the support is dense, chemically treating it to render it porous, and (g) washing and drying the resulting composite.

Process B will be more specifically described.

The formation of the ultrathin film surface layer of an alloy of aluminum or gallium and silicon or germanium on the support can be carried out by conventional methods of thin film formation, such as plating, flame spraying, vacuum deposition and cathode sputtering. Oxidation of the ultrathin alloy film can be carried out by various chemical oxidizing methods and electrochemical anodizing methods. Since aluminum or gallium is much more resistant to oxidation than silicon or germanium, full considerations are necessary for oxidizing the thin alloy film. For example, it is necessary to employ a very rigorous oxidizing method such as chemical oxidation with nitric acid, or anodization with conc. chromic acid. The support is a porous support or a dense support which can later be rendered porous by a chemical treatment. It is made of a metal, an inorganic material or a polymeric material. The use of metals having a high affinity for the alloy is preferred. In particular, when an electrochemical oxidizing step is required, a material having electric conductivity is used. In order to coalesce the ultrathin alloy film rapidly and firmly with the support after its formation, it is preferred to perform a high pressure treatment, for example in an ultrasonic impact grinder, an isostatic press or a high-temperature high-pressure sintering furnace or by explosive bonding.

The steps (c) to (g) can be carried out in accordance with Process A.

PROCESS C

A process which comprises (a) plating one surface of a porous metal support or a dense metal support capable of being rendered porous by a chemical after-treatment, with a mixture of an aluminum or gallium salt and a silicon or germanium salt by oxidation-reduction reaction (silver mirror reaction) in accordance with an electroless plating technique, (b) oxidizing the resulting plated ultrathin film, (c) dipping the oxidized ultrathin film in an aqueous solution of a hydroxide of an alkali metal, an alkaline earth metal, ammonium or an alkyl-substituted ammonium to form a surface gel layer, (d) hydrothermally treating the resulting surface gel layer at a temperature of at least 30° C., (e) if required, reducing the content of the alkali metal, alkaline earth metal, ammonium or alkyl-substituted ammonium in the crystallized gel to not more than 1% by an ion-exchange treatment, (f) when the porous support is dense, chemically treating it to render it porous, and (g) washing and drying the resulting composite.

Process C will be more specifically described. As a first step, a mixture of an aluminum or gallium salt and a silicon or germanium salt is applied to the surface of the metal support by electroless plating to convert the salts to metals and form an ultrathin film of the metals on the surface. The salts used for electroless plating may be those which are ordinarily used, for example, the halides, nitrates, cyanides, metal halide cyanides and sulfates. The plating bath used may contain electroless plating promoting aids such as alkali metal cyanides, alkali metal halides, and/or alkaline earth metal halides. The support may be a porous metal support or a dense metal support which can be converted to a porous support by a chemical after-treatment. The steps (b) to (g) can be carried out in the same way as in Process B.

PROCESS D

A process which comprises (a) forming an ultrathin film of a metal oxide comprising aluminum or gallium and silicon or germanium on one surface of a porous support of a metal, an inorganic material or a polymeric material or a dense support of the same material capable of being rendered porous by a chemical after-treatment, (b) dipping the ultrathin film of the metal oxide in an aqueous solution of a hydroxide of an alkali metal, an alkaline earth metal, ammonium or an alkyl-substituted ammonium to form a surface gel layer, (c) hydrothermally treating the formed surface gel layer at a temperature of at least 30° C. to crystallize it, (d) if required, reducing the content of the alkali metal, alkaline earth metal, ammonium or alkyl-substituted ammonium in the crystallized gel to not more than 1% by an ion exchange treatment, (e) when the support is dense, chemically treating it to render it porous, and (f) washing and drying the resulting composite.

Process D will be more specifically described below. Raw materials used in the production of granular catalysts such as silica-alumina, clays (e.g., kaolin), a mixture of a clay and silica-alumina, silica-alumina-magnesia, and silica-alumina-zirconia may be used as starting materials for the formation of the ultrathin film because they can be obtained at low cost and are of good quality. Granular catalysts are prepared from these materials frequently by wet granulation. Stable, uniform and dilute solutions obtained during this process can be used in Process D.

In one preferred embodiment, the ultrathin film of the metal oxide is formed by preparing an aqueous solution of sodium silicate or sodium germanate, adding an amount, required for the final ultrathin film, of an aqueous solution of aluminum sulfate or gallium sulfate, stirring the mixture thoroughly to form the corresponding oxide gel, passing it through a microfilter and depositing it uniformly on the support.

The support used in this process is a porous support of a metal, an inorganic material or a polymeric material, or a dense support of the same material which can be rendered porous by a chemical after-treatment. Preferred supports are stable materials having a high affinity for the oxide gel. Porous glass and porous ceramics are especially preferred. Non-oiling bearing metals called oilless metals can also be used as the support.

An ideal ultrathin film of the metal oxide is formed by such a technique as cathode sputtering, molecular epitaxy or vacuum deposition. For example, a vacuum evaporation device having two crucibles at the bottom and two shutters and made by Nippon Shinku Gijutsu K.K. (ULVAC) or Nichiden ANERVA Co., Ltd. can be preferably used. When this device is used, the metal oxide are put in the crucibles and melted to the desired degree of vacuum. A shutter is disposed between one surface of the support and each melting crucible and the oxides can be deposited to a thickness of 2 to 20 Å on one surface of the support alternately.

The steps (b) to (f) can be carried out in the same way as in steps (c) to (g) of process B.

PROCESS E

A process which comprises (a) forming an ultrathin film of one of an oxide of aluminum or gallium and an oxide of silicon or germanium on one surface of a porous support made of the other of said oxides or a dense support of the same material capable of being rendered porous by a chemical after-treatment, (b) dipping the support in an aqueous solution of a hydroxide of an alkali metal, alkaline earth metal, ammonium or an alkyl-substituted ammonium to gel the oxide of the ultrathin film and the oxide of the support adjacent the ultrathin film.

(c) hydrothermally treating the resulting gel at a temperature of at least 30° C. to crystallize it, (d) if required, reducing the content of the alkali metal, alkaline earth metal, ammonium or alkyl-substituted ammonium in the crystallized gel to not more than 1% by an ion-exchange treatment, (e) when the support is dense, chemically treating it to render it porous, and (f) washing and drying the resulting composite.

Process E will be specifically described below. This process is considered to be one modification of process D. According to this process, one of the oxides is used as a support, and an ultrathin film of the other is formed on one surface of the oxide support. Then, the ultrathin film and the adjacent support oxide are gelled. By hydrothermally treating these gels, the desired cage-shaped zeolite crystals are formed on the support.

When the oxide of an aluminum or gallium is used as the support, active alumina, active bauxite, porous gallium oxide, etc. can be used. It is possible to use a dense support composed of a co-molten mixture of alumina and boron oxide and chemically treat it later to render it porous.

Ultrafine particles of silica or germanium dioxide having a diameter of about 50 Å obtained by wet granulation are deposited on one surface of the support through a microfilter or UF membrane. An ultrathin film of the oxide may also be formed by vapor deposition, cathode sputtering, plating, etc. There may also be used a method which comprises forming an ultrathin film of another derivative of silicon or germanium on one surface of the support and oxidizing it in situ. Examples of the other derivative of silicon or germanium used in such a method include silicon tetrachloride, silicon tetraacetate, tetraethoxysilane, germanium disulfide, germanium tetrachloride and germanium tetrafluoride.

Alternatively, an ultrathin film may be formed on a porous glass support composed of silica such as VYCOR 7930 glass or a porous support of germanium dioxide or a dense support capable of being converted into a porous silica or germanium dioxide support by a chemical after-treatment by depositing ultrafine particles of alumina or gallium oxide having a diameter of about 50 Å obtained by wet granulation through a microfilter or UF membrane. In this case, the ultrathin film surface layer may also be formed by the vapor deposition, cathode sputtering, etc. of alumina or gallium oxide.

There can also be used a method which comprises forming an ultrathin film of another derivative of aluminum or gallium on the support and oxidizing it in situ. This can be achieved, for example, by coating one surface of the support with a thin uniform layer of a solution, such as an aqueous solution of aluminum triacetate, an aqueous solution of basic aluminum acetate (mordenite rough), a boiling aqueous solution of aluminum triformate trihydrate, an aqueous solution of basic aluminum formate monohydrate, an aqueous solution of aluminum chloride, an aqueous solution of aluminum bromide, an aqueous solution of aluminum nitrate nonahydrate, an aqueous solution of gallium trichloride or an aqueous solution of gallium tribromide, and oxidizing the coated layer, followed by gellation and crystallization by the procedure described above.

The steps (b) to (f) can be carried out substantially in accordance with steps (b) to (f) of Process D.

When the composite membrane of this invention having a surface layer of an ultrathin film of a cage-shaped zeolite is produced in accordance with Processes A to E described above, the hydroxides of an alkali metal, an alkaline earth metal, ammonium and an alkyl-substituted ammonium may be used singly or in combination for the purpose of gelling. If, however, it is desired to obtain a crystal phase grown highly when observed by X-ray diffraction and under a scanning electron microscope, it is preferred to use an alkali metal hydroxide such as sodium hydroxide and/or potassium hydroxide. When it is used with another hydroxide, it is preferably used in excess. It should be noted in this regard that the composite membrane of this invention can achieve a molecular sieving action and/or a catalytic action even when the growth of its crystal phase is not high enough when observed by X-ray diffraction and under a scanning electron microscope.

As required, the ultrathin film of alkali metal cation-containing cage-shaped zeolite so formed may be subjected to an ion exchanging treatment to deposit a polyvalent ion, a rare earth metal or a transition metal thereon. The ultrathin film of a cage-shaped zeolite in which the silicon or germanium atoms are sufficiently in excess of the aluminum or gallium atoms is tough and resistant to chemical treatments such as ion exchange. According, no problem arises when it is subjected to ion exchanging. However, the composite membrane having an ultrathin film of a cage-shaped zeolite which is relatively rich in aluminum or gallium atoms is not necessarily stable to chemical treatments such as ion exchanging. With the latter structure, therefore, it is preferred to use a hydroxide of an alkaline earth metal, ammonium or an alkyl-substituted ammonium from the start or use it in combination with an alkali metal hydroxide in order to avoid a subsequent chemical treatment such as ion exchanging. Composite membranes having thin films of N-A type, ZK-5 type, ZSM-5 and silicalite type zeolites having non-exchangeable lower and higher alkyl ammonium ions. To produce such zeolite films, it is necessary to introduce a lower or higher alkyl ammonium ion in the gelling step.

The following examples illustrate the processes for producing the composite membranes of the invention and the use of these membranes to achieve a molecular sieving action and/or a catalytic action. It should be understood that the invention is in no way limited to these specific examples.

EXAMPLE 1 (PROCESS A)

Sodium aluminate ($NaAlO_2$ 87%) was dissolved in water and silica sol ($SiO_2$ 30%) was added to the solution, in such proportions as to provide a $Na_2O/SiO_2$ ratio of 0.5, a $SiO_2/Al_2O_3$ ratio of 4 and a $H_2O/Na_2O$ ratio of 246. The mixture was stirred at room temperature for 30 minutes so as to make it uniform, and then an aqueous solution of sodium hydroxide was added so as to provide a pH of 12 and thus to obtain a gel having the aforesaid composition.

One surface of a sintered body of stainless steel (a support for a flat membrane) having a diameter of 5.0 cm and a thickness of 2.0 mm for use in a commercially available flat film reverse osmosis test device was coated with molten wax. The stainless steel support was placed at the bottom of a beaker with the wax-coated surface down, and dipped in an aqueous solution of sodium hydroxide (pH 12) put in the beaker. A 0.2 micron microfilter was placed in contact with the surface of the liquid in the beaker, and the gel obtained as above was gently let fall onto the microfilter. One hour later, the stainless steel support was gently taken out, and subjected to a hydrothermal treatment at 110° C. for about 5 hours in a sealed Pyrex glass tube. The product was well washed with hot water and dried in the air. By X-ray diffraction analysis and observation under an electron microscope, the thickness of the resulting ultrathin film of zeolite was found to be about 100 Å. The structure of the zeolite was determined to be a A-type by X-ray and ultrared Fourier analyses. The resulting ultrathin film was an ultrathin film of cage-shaped zeolite in which the frame of the NaA-type 8-membered oxygen ring window had a pore diameter of about 4 Å and the cavity had an inside diameter of about 11 Å.

The following experiment was carried out in order to confirm the molecular sieve effect of the resulting surface layer of the ultrathin film of NaA-type cage-shaped zeolite. A flat membrane reverse osmosis test device made by ULVAC was used. At room temperature and under a pressure of 15 atms. on the feed side and atmospheric pressure on the separation side, a mixture of methane, ethane and propane (standard hydrocarbons manufactured by Phillips Petroleum Company) each in a proportion of 33.3 mole% was introduced into the feed side. Gas-chromatographic analysis led to the determination of the presence of 73.5 mole% of methane, 26.0% of ethane and 0.5 mole% of propane on the separation side.

The product obtained in this example is a novel hydrocarbon separation membrane and can be used in practical applications.

EXAMPLE 2

The NaA-type zeolite surface layer of the composite membrane obtained in Example 1 was exchanged with a $Ca^{2+}$ ion by a conventional method so as to reduce the Na ion content to not more than 0.5%. It was ascertained by X-ray Fourier analysis that the pore diameter increased to about 5 Å.

The following experiment was carried out to confirm the molecular sieve effect of the resulting composite membrane. A gas-chromatographic device was directly connected to the separation side of a flat membrane reverse osmosis test device of ULVAC. A mixture of 12.3% by weight of n-heptane and 87.5% by weight of methylcyclohexane (standard hydrocarbons manufactured by Phillips Petroleum Company) was fed under a pressure of 16 atms. At room temperature, n-heptane having a purity of 98.5% was obtained on the separation side.

EXAMPLE 3

The surface layer of the ultrathin film of NaA-type cage-shaped zeolite of the composite membrane obtained in Example 1 was converted to HA-type by the following reaction.

The ultrathin film of the NaA-type cage-shaped zeolite on the same support as in Example 1 having a diameter of 5.0 cm was treated with stirring at 100° C. for 15 minutes in an aqueous solution of 100 g of ammonium sulfate in 500 g of water. The solid dissolved was removed by filtration, and the film was again treated in an aqueous solution of 40 g of ammonium sulfate in 500 g of water. The treated ultrathin film was then washed with water until the sulfate ion in the cage-shaped zeolite surface layer disappeared.

After washing with water, the film was treated at 540° C. for 3 hours, and then treated with stirring in an aqueous solution of 25 g of ammonium sulfate in 500 g of water. The solid was removed by filtration, and the film was washed with water until the sulfate ion disappeared. It was further subjected twice to a combination of treatment with an aqueous solution of 25 g of ammonium sulfate and 500 g of water and washing with water. After through washing, the film was heat-treated at 815° C. for 3 hours. There was obtained a composite membrane having a surface layer of superstable HA-type zeolite completely free from a Na+ cation.

The following experiment was conducted in order to confirm the molecular sieve effect and the catalytic effect of the resulting composite. The commercially available flat membrane reverse osmosis test device of ULVAC was remodelled so that the temperature on the flat membrane could be elevated to 1000° C. at the highest. Cumene as a standard hydrocarbon made by Phillips Petroleum Company was used as a starting material. A gas-chromatographic device was directly connected to the separation side of the test device. The device was operated by setting the temperature of the membrane surface at 450° C. and the pressure of cumene at 18 atmospheres. Five minutes after the temperature reached 450° C., the generation of propylene was determinned by gas chromatography.

EXAMPLE 4 (PROCESS A)

Sodium aluminate (NaAlO$_2$ 87%) was dissolved in water, and sodium silicate (commercial synthetic detergent grade) was added, in such proportions as to provide a Na$_2$O/SiO$_2$ ratio of 0.8, a SiO$_2$/Al$_2$O$_3$ ratio of 18 and a H$_2$O/Na$_2$O ratio of 50. The mixture was then subjected to gellation, film formation, hydrothermal treatment, washing with water and air drying in the same way as in Example 1. By X-ray diffraction analysis and observation under a scanning electron microscope, the resulting ultrathin film of zeolite was determined to have a thickness of about 70 Å. X-ray and ultrared Fourier analyses led to the determination that the zeolite was of the NaY type and had a pore diameter of about 10 Å.

EXAMPLE 5

By a conventional method of synthesizing REY-type zeolite from commercial Davison Y-type zeolite, the ultrathin film of NaY-type cage-shaped zeolite obtained in Example 4 was converted to REY-type containing a mixture of rare earth elements (36% lanthanum, 28% cesium, 25% niobium and 11% others).

The following experiment was conducted in order to confirm the molecular sieve effect and the catalitic effect of the resulting composite membrane having a surface layer of the REY-type cage-shaped zeolite film. The same remodelled device as used in Example 3 was used, and n-hexane as a standard hydrocarbon manufactured by Phillips Petroleum Company was used as a starting material. n-Hexane was supplied under a pressure of 15 atms. When the temperature of the flat membrane surface rose to 450° C., the pressure of n-hexane was increased to 17 atoms. At this moment, the gas-chromatographic device on the separation side determined the presence of 68.3% by weight of ethylene and 31.8% by weight of propylene.

EXAMPLE 6

A composite membrane having a surface layer of CaY-type cage-shaped zeolite obtained by ion exchanging of the surface layer of the composite membrane obtained in Example 4 was subjected to ion-exchange with Pd(NH$_3$)$_4$$^{2+}$ in accordance with a conventional method. The ion-exchanged membrane was dried, calcined at 500° C., and reduced with hydrogen at 300° C. It was found that 0.5% by weight of palladium was deposited on the cage-shaped zeolite surface layer.

The following experiment was conducted by using the same device and reagent as in Example 5 in order to confirm the molecular sieve effect and the catalytic effect of the resulting composite membrane having the ultrathin film of Pd-supported Y-type zeolite. Specifically, n-hexane (a standard hydrocarbon manufactured by Phillips Petroleum Company) was fed under 15 atms. When the temperature of the flat membrane surface rose to 450° C., the pressure of n-hexane was increased to 17 atoms. At this moment, the gas-chromatographic device on the separation side detected ethylene and propylene.

Assuming that the transition metal would react at a lower temperature than the rare earth metal, the experiment was repeated at a lower reaction temperature. It was found that catalytic cracking took place at a temperature of 251° C. at the lowest.

EXAMPLE 7 (Process B)

One surface of a 4 cm diameter circular portion of a porous nickel support (diameter 5.0 cm, thickness 2.0 mm) was coated with molten wax, and an epoxy resin-impregnated glass mat (diameter 5 cm) was placed on the wax-coated surface. Another kind of epoxy resin was coated on the surface and cured.

One surface of the porous support was electrolytically oxidized by using a plating bath composed of sodium aluminate, sodium silicate, sodium cyanide, sodium hydroxide and water at a temperature of 20° C., a current density of 0.5 A/dm$^2$ and a voltage of 2 V using aluminum as an anode. Subsequently, the Al-Si plated portion was electrolytically oxidized by a conventional method. The epoxy-coated portion was removed, and the porous support was put in a beaker containing an aqueous solution of sodium hydroxide (pH 12) with the oxidized surface layer up. While the solution was thoroughly stirred, the support was treated at 30° C. for 8 hours and then at 40° C. for 12 hours to gel the surface layer. The support was then subjected to a hydrothermal treatment in a sealed Pyrex glass tube at 110° C. for 100 hours. The product was subjected twice to a combination of washing with hot water and air drying to obtain a composite membrane having an ultrathin film of NaX-type cage-shaped zeolite (determined by X-ray and ultrared Fourier analyses) having a thickness of about 30 Å (measured by X-ray photoelectrospectrometry) and a pore diameter of about 8 Å. This composite membrane was subjected to ion exchange to convert the zeolite to CaX-type, and an experiment was carried out to confirm its molecular sieve effect. As a result, n-paraffins were selectively separated from a gasoline fraction.

The same procedure as above was repeated except that in the plating bath, sodium gallate was used instead of sodium aluminate or sodium germanate was used instead of sodium silicate. In either case, a composite membrane having a surface layer of an ultrathin film of the corresponding cage-shaped zeolite was obtained.

EXAMPLE 8 (Process D)

A solution of sodium silicate was gelled with carbon dioxide, and a solution of aluminum sulfate was added. The mixture was filtered, washed and dried to form silica-alumina.

An epoxy resin was coated on one surface of a dense support (diameter 5.0 cm, thickness 2.0 mm) of an alloy of nickel and aluminum, and cured. The degree of vacuum was adjusted to 0.0002 mmHg over the course of 15 minutes, and the silica-alumina was vacuum-evaporated for about 10 seconds on one surface of the dense support to a thickness of 20 Å.

About 20 g of solid sodium hydroxide was dissolved in 680 g of water, and the solution was put in a beaker. The vacuum-deposited dense support was dipped at 30° C. in the aqueous solution of sodium hydroxide in the beaker with its epoxy-coated surface down. The solution was well stirred. The temperature was raised to 40° C., and the solution was further stirred for about 18 hours. The support was then washed with hot water three times, and then subjected to a hydrothermal treatment at 100° C. for about 18 hours. The epoxy layer was removed, and then aluminum was removed from the dense support by treating it in an aqueous solution of strong alkali (45% NaOH) to render the support porous. X-ray and ultrared Fourier analyses led to the determination that the surface layer of the support was an ultrathin film of NaY-type cage-shaped zeolite. The thickness of the surface layer was about 20 Å when measured by a high performance angle resolved X-ray optical spectrometer.

The NaY-type surface layer of the resulting composite membrane was subjected to an ion-exchanging treatment in a customary manner to convert it to CaY-type, and further, palladium was deposited on it.

The same experiment as in Example 6 was carried out in order to confirm the molecular sieve effect and the catalytic effect of the composite membrane obtained. It catalytic activity was observed at a temperature of 248° C. at the lowest, and substantially the same effect as in Example 6 was obtained.

It was expected that the porous support itself formed from the dense support as above would have catalytic activity. Thus, the following experiment was conducted.

A mixture of 23.3 mole% of n-hexane, 48.2 mole% of methylcyclohexane and 28.5 mole% of hydrogen (the hydrocarbons were standard hydrocarbons produced by Phillips Petroleum Company) was fed to the remodelled device used in Example 3 under a pressure of 16 atms. and a flat membrane surface temperature of 270° C. The gas-chromatographic device on the separation side detected ethane and propane.

This fact demonstrates that n-heptane was selectively separated (passed) by the molecular sieve action and converted to ethylene and propylene by being catalytically cracked with palladium (catalytic action), and furthermore they were hydrogenated (catalytic action) by the support.

EXAMPLE 9 (Process E)

One surface of VYCOR 7930 glass (porous support) was caoted uniformly and thinly with an acetic acid-water solution of basic aluminum acetate (mordenite rouge). The coated support was heated gradually in an electric furnace and insolubilized at about 500° C. to form an aluminum oxide surface layer. The support was then dipped at 40° C. for 18 hours in an aqueous solution (pH 10) of equimolar proportions of sodium hydroxide and potassium hydroxide to gel the aluminum oxide surface layer and the adjacent surface layer of the support.

Then, the support was subjected to a hydrothermal treatment at 100° C. for 4 days in a Teflon-coated autoclave. X-ray diffraction analysis and observation under a scanning electron microscope led to the determination that a film of a cage-shaped zeolite peculiar to sodalite crystals was formed uniformly in a thickness of about 20 Å on the support. About ⅔ of the NaA-type ultrathin film was ion-exchanged and converted to CaA-type and by using a jig, the composite membrane having the CaA-type ultrathin film was processed to adapt it for use in the reverse osmosis test device used in Example 1. The circumferential portion of the composite film was then treated with a silicone adhesive and sealed into the device.

Industrial kerosene obtained from Minus crude oil was fed into this device at room temperature under a pressure of 17 atms. The following analytical data were obtained by the gas-chromatographic device on the separation side.

$C_{10}$n-paraffin: 6.3% by weight
$C_{11}$n-paraffin: 19.8% by weight
$C_{12}$n-paraffin: 30.2% by weight
$C_{13}$n-paraffin: 24.7% by weight
$C_{14}$n-paraffin: 13.7% by weight
$C_{15}$n-paraffin: 3.5% by weight

EXAMPLE 10 (Process E)

One surface of a porous support of active alumina (diameter 50.0 mm, thickness 2.0 mm) was fully polished to provide a homogeneous surface. Silicon tetrachloride was coated thinly and uniformly on the polished surface, and then moisture was imparted to it to convert it to a thin silica film. Thereafter, by the same procedure as in Example 9, the film was gelled by an alkali metal hydroxide, hydrothermally treated, washed with water and dried in the air.

It was determined by high performance angle-resolved X-ray photoelectrospectrometer that a uniform ultrathin film of NaA-type zeolite was formed uniformly in a thickness of about 20 Å on the support.

About ⅔ of the NaA-type ultrathin film portion was ion-exchanged and converted to CaA-type. The composite membrane was processed and sealed in the reverse osmosis test device as in Example 9, and the same reverse osmosis test as in Example 9 was carried out. The following data were obtained by the gas-chromatographic device on the separation side.

$C_{10}$n-paraffin: 6.5% by weight
$C_{11}$n-paraffin: 19.7% by weight
$C_{12}$n-paraffin: 30.5% by weight
$C_{13}$n-paraffin: 25.2% by weight
$C_{14}$n-paraffin: 13.3% by weight
$C_{15}$n-paraffin: 3.1% by weight

What is claimed is:

1. A permeable composite membrane, comprising: a porous support; and an ultrathin film of a cage-shaped non-granular zeolite composed of a 6-, 8-, 10-, or 12-membered oxygen ring window having aluminum or gallium atoms, silicon or germanium atoms, and oxygen atoms as constituent members, said ultrathin film of non-granular zeolite being a continuous surface layer on said porous support whereby said permeable composite membrane is adapted to selectively separate materials passing through said permeable composite membrane utilizing molecular sieve separation action and/or catalysis and whereby said separation is performed by a continuous non-phase change process.

2. The permeable composite membrane of claim 1 wherein the aluminum, gallium, silicon or germanium atoms are partly replaced by phosphorus, arsenic or beryllium atoms.

3. The composite membrane of claim 1 wherein the cage-shaped zeolite is of the alkali metal, alkaline earth metal, ammonium or alkyl-substituted ammonium type.

4. The composite membrane of claim 1 wherein the cage-shaped zeolite is of H-type.

5. The composite membrane of claim 1 wherein the cage-shaped zeolite is of a rare earth metal type.

6. The composite membrane of claim 1 wherein the cage-shaped zeolite is of a transition metal type.

7. A process for producing a permeable composite membrane, comprising:
   (a) mixing an aluminate or gallate and a silicate or germanate in the form of an alkali metal salt, an alkaline earth metal salt, an ammonium salt or a lower alkyl-substituted ammonium salt with an aqueous solution of a hydroxide of an alkali metal, an alkaline earth metal, ammonium or an alkyl-substituted ammonium to form a gel,
   (b) passing the formed gel through a micro filter having a size of at least approximately 0.2 micron,
   (c) depositing uniformly the filtered gel on one smooth surface of a porous support or a dense support capable of being rendered porous by a chemical after-treatment to form a surface gel layer,
   (d) hydrothermally treating the formed surface gel layer at a temperature of at least 30° C. to crystallize the gel thereby forming an ultrathin film of cage-shaped non-granular zeolite being a continuous surface layer on said support,
   (e) if required, reducing the content of the alkali metal, alkaline earth metal, ammonium or alkyl-substituted ammonium in the crystallized gel to not more than 1% by an ion exchange treatment,
   (f) when the support is dense, chemically treating it to render it porous, and
   (g) washing and drying the resulting permeable composite membrane.

8. A process for producing a permeable composite membrane, comprising:
   (a) forming a continuous ultrathin film of an alloy composed of aluminum or gallium and silicon or germanium on one smooth surface of a porous support or a dense support capable of being rendered porous by a chemical after-treatment,
   (b) subjecting the ultrathin alloy film to an oxidation treatment,
   (c) dipping the oxidized ultrathin film in an aqueous solution of a hydroxide of an alkali metal, an alkaline earth metal, ammonium or an alkyl-substituted ammonium to form a surface gel layer,
   (d) hydrothermally treating the formed surface gel layer at a temperature of at least 30° C. to crystallize the gel thereby forming the desired cage-shaped zeolite crystals, said crystals being a continuous surface layer on said support,
   (e) if required, reducing the content of the alkali metal, alkaline earth metal, ammonium or alkyl-substituted ammonium in the crystallized gel to not more than 1% by an ion-exchange treatment,
   (f) when the support is dense, chemically treating it to render it porous, and
   (g) washing and drying the resulting permeable composite membrane.

9. A process for producing a permeable composite membrane, comprising:
   (a) plating one smooth surface of a porous metal support or a dense metal support capable of being rendered porous by a chemical after-treatment, with a mixture of an aluminum or gallium salt and a silicon or germanium salt by oxidation-reduction reaction in accordance with an electroless plating technique,
   (b) oxidizing the resulting plated ultrathin film,
   (c) dipping the oxidized ultrathin film in an aqueous solution of a hydroxide of an alkali metal, an alkaline earth metal, ammonium or an alkyl-substituted ammonium to form a surface gel layer,
   (d) hydrothermally treating the resulting surface gel layer at a temperature of at least 30° C. to crystallize the gel thereby forming the desired cage-shaped zeolite crystals, said crystals being a continuous surface layer on said support,
   (e) if required, reducing the content of the alkali metal, alkaline earth metal, ammonium or alkyl-substituted ammonium in the crystallized gel to not more than 1% by an ion-exchange treatment,
   (f) when the porous support is dense, chemically treating it to render it porous, and
   (g) washing and drying the resulting permeable composite membrane.

10. A process for producing a permeable composite membrane, comprising:
    (a) forming a continuous ultrathin film of a metal oxide comprising aluminum or gallium and silicon or germanium on one smooth surface of a porous support or a dense support capable of being rendered porous by a chemical after-treatment,
    (b) dipping the ultrathin film of the metal oxide in an aqueous solution of a hydroxide of an alkali metal, an alkaline earth metal, ammonium or an alkyl-substituted ammonium to form a surface gel layer,
    (c) hydrothermally treating the formed surface gel layer at a temperature of at least 30° C. to crystallize the gel thereby forming the desired cage-shaped zeolite crystals, said crystals being a continuous surface layer on said support,
    (d) if required, reducing the content of the alkali metal, alkaline earth metal, ammonium or alkyl-substituted ammonium in the crystallized gel to not more than 1% by an ion-exchange treatment,
    (e) when the support is dense, chemically treating it to render it porous, and
    (f) washing and drying the resulting permeable composite membrane.

11. A process for producing a permeable composite membrane, comprising:
    (a) forming a continuous ultrathin film of one of an oxide of aluminum or gallium and an oxide of silicon or germanium on one smooth surface of a porous support or a dense support capable of being rendered porous by a chemical after-treatment,
    (b) dipping the support in an aqueous solution of hydroxide of an alkali metal, alkaline earth metal, ammonium or alkyl-substituted ammonium to gel the oxide of the ultrathin film and the oxide of the support adjacent the ultrathin film,
    (c) hydrothermally treating the resulting gel at a temperature of at least 30° C. to crystallize the gel thereby forming the desired cage-shaped zeolite crytals, said crystals being a continuous surface layer on said support, (d) if required, reducing the content of the alkali metal, alkaline earth metal, ammonium or alkyl-substituted ammonium in the crystallized gel to not more than 1% by an ion-exchange treatment, (e) when the support is dense, chemically treating it to render it porous, and (f) washing and drying the resulting permeable composite membrane.

* * * * *